Jan. 14, 1930.                    S. C. BLACK                    1,743,313
                                   INDICATOR
                              Filed March 5, 1928
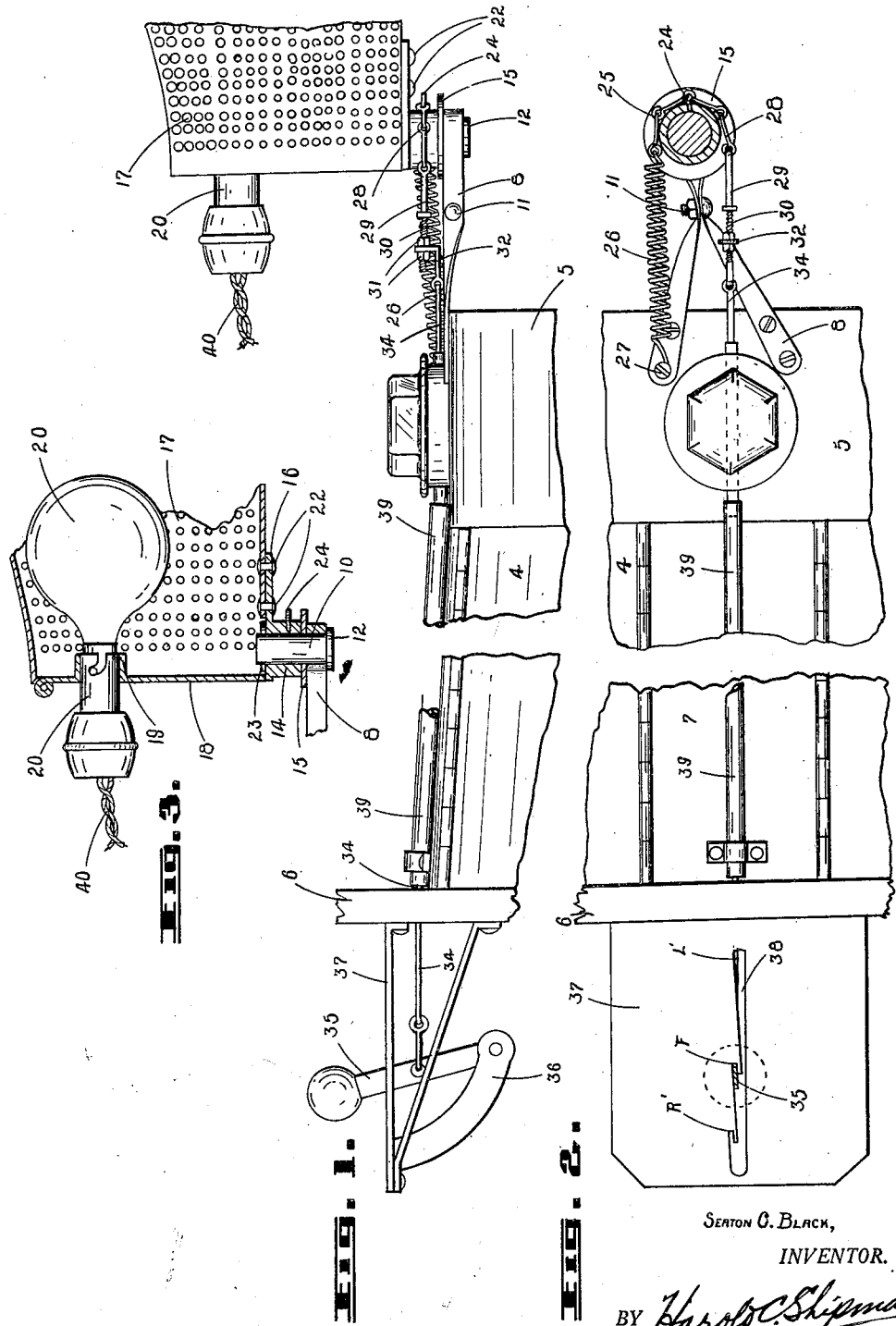
Seaton C. Black,
INVENTOR.
BY Harold C. Shipman
ATTORNEYS.

Patented Jan. 14, 1930

1,743,313

UNITED STATES PATENT OFFICE.

SEATON C. BLACK, OF MONTREAL, QUEBEC, CANADA

INDICATOR

Application filed March 5, 1928. Serial No. 259,356.

This invention relates to indicators and particularly to an indicator adapted to be mounted on an automobile to indicate the intention of the driver as to the direction in which the automobile is to be driven.

A further object is to provide a simple construction which can be manufactured at a reasonable cost, can be easily and quickly installed and is simple and efficient in operation.

With the foregoing and other objects in view, as will appear as the description proceeds, the invention consists of the novel construction, combination and arrangement of co-operating elements as hereinafter more specifically set forth, claimed and shown in the accompanying drawings forming a part of the present application, in which:

Fig. 1 is a side elevation of the preferred embodiment of my invention as mounted on a section of an automobile hood.

Fig. 2 is a top plan view looking down on the same, an intermediate portion being broken away.

Fig. 3 is a detail view of the preferred method of mounting.

Like numerals of reference designate corresponding parts throughout the different views.

4 indicates the hood portion of a car, 5 the radiator, 6 the instrument board and 7 the back intermediate the hinge side sections of the hood. 8 is a brace having its ends suitably supported from the top of the radiator 5. Each side of this brace 8 is curved as at 9 to provide a central holder snugly fitting around the standard 10. The sides of the brace, as at 9, are tightened together by a threadedly retained clamping member 11 by which the central portion of the brace 8 is tightly engaged around the standard 10. The lower end of the standard 10 is provided with an annular flanged portion as at 12. 14 is a bracket adapted to swing on the upper portion of the standard 10. 15 is a washer intermediate the lower end of the bracket 14 and the upper edge of the central portion of the brace 8.

17 is a hand-shaped indication member formed from foraminous material. The back portion 18 is hingedly connected at its upper end to the body portion. This back portion, adapted to be swung outwardly, is provided with an inwardly directed sleeve portion 19 in which an electric bulb holder 20 is retained to support the bulb 21 inside the body portion of the indication member 17. The indication member 17 is supported from the bracket 14 by means of rivets or small bolts 22. A cotter pin 23 extends transversely through the upper end of the standard 10 to retain the bracket 14 in position on the standard 10.

The bracket 14 has threaded therein an outwardly directed eye-screw 24. A chain 25 has one end connected to this eye-screw 24 and the other end connected to the outer end of a recoil spring 26, the inner end of the recoil spring being suitably retained on the radiator top as at 27. A chain 28 has one end connected to the opposite side of the eye-screw 24 to which the chain 25 is attached. The other end of this chain 28 is connected to an adjustment member 29, having a threaded portion 30 on which lock nuts 31 are threadedly engaged. Intermediate the lock nuts 31, I provide a link 32 having a rearwardly extended portion from its under side, as at 33, to which the end of a flexible control wire 34 is attached. This control wire 34 extends rearwardly over the hood of the automobile and is connected to a lever 35, one end of which is mounted in a bracket 36, supported from the under side of the plate 37. The plate 37 is provided with a notched slot 38. The lever 35 extends up through this notched slot 38 and is adapted to be shifted from one notch to the other.

On Fig. 2, I have shown dotted lines to indicate a section of the base portion of the indication member 17 as it would be positioned in its three indicating positions. The letter F indicates the position showing the hand as pointing in a forward direction; the letter L indicating the hand as pointing in a left-hand direction to indicate that the driver is contemplating a left-hand turn; while the letter R indicates the hand as pointing in a right-hand direction to indicate that the driver is contemplating a right-hand turn. I have indicated the position of the lever 35 as being in the central notch of the slot 38 and have indicated this slot by the letter F' as the lever 35 would be in this slot F' when the indication member 17 would be in a forward direction. If the lever 35 was pulled back to the notch indicated by the letter R', the bracket 14 would be turned on the standard 10, carrying with it the indication member 17 to the position indicated by the dotted lines and the letter R. If the lever 35 was moved forward to the inner end L' of the slot 38, the bracket 14 would be turned on the standard 10 by means of the recoil spring 26, carrying with it the indication member 17 to the position indicated by the dotted lines and the letter L.

In the drawings, I have illustrated the control wire 34 as extending through the tubular member 39. In Fig. 2, I have indicated in dotted lines that this tubular member 39 may extend through the intake opening of the radiator 5. I do not wish to limit myself to any particular manner of providing the tubular member 39, its particular position on the hood 4, or as to whether it extends through the intake opening of the radiator 5 or not, as this control wire 34 may be carried over the radiator back to the instrument board in any desired efficient and convenient manner. Likewise, I do not wish to be limited in the electric wiring 40 between the bulb 21 and the source of supply as any convenient manner may be adapted for this particular purpose.

The foregoing specification and annexed drawings disclose the preferred embodiment of my invention, but it is to be understood that minor changes may be resorted to in the commercial adaptation of my invention without departing from the scope of the invention as hereinafter claimed.

What I claim as new is:

A direction indicator comprising a brace adapted to be attached to a vehicle; an upright standard fixedly supported in said brace; a bracket composed of a body portion, having an outwardly protruding arm integral therewith; an annular opening in said body portion whereby said bracket may be fitted snugly over said standard and adapted to swing thereon in a horizontal plane; an indicator supported at one end on said arm and normally extending forwardly of said vehicle; a flexible member connected intermediate its ends to the forward side of said body portion; a lever conveniently mounted in said vehicle; a control member, having one end attached to one end of said flexible member and its other end attached to said lever; a control plate through which said lever extends; said control plate having notches formed therein for retaining said lever in three-pre-determined positions corresponding to right, forward and left positions of said indicator and a recoil spring having one end engaged with said brace and the other end connected to the other end of said flexible member, so as to provide constant, tension against said control member.

In testimony whereof, I affix my signature.
SEATON C. BLACK.